(12) United States Patent
Zhang et al.

(10) Patent No.: US 12,812,600 B2
(45) Date of Patent: Nov. 24, 2026

(54) METHOD, DEVICE AND COMPUTER READABLE MEDIUM FOR RESOURCE SELECTION IN V2X

(71) Applicant: NEC CORPORATION, Tokyo (JP)

(72) Inventors: Shichang Zhang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 363 days.

(21) Appl. No.: 17/765,276

(22) PCT Filed: Sep. 30, 2019

(86) PCT No.: PCT/CN2019/109618
§ 371 (c)(1),
(2) Date: Mar. 30, 2022

(87) PCT Pub. No.: WO2021/062715
PCT Pub. Date: Apr. 8, 2021

(65) Prior Publication Data
US 2022/0394678 A1 Dec. 8, 2022

(51) Int. Cl.
*H04W 72/02* (2009.01)
*H04W 72/04* (2023.01)
(Continued)

(52) U.S. Cl.
CPC ......... *H04W 72/02* (2013.01); *H04W 72/044* (2013.01); *H04W 72/20* (2023.01)

(58) Field of Classification Search
CPC ............... H04W 72/02; H04W 72/044; H04W 72/20; H04W 72/0446
See application file for complete search history.

(56) References Cited

U.S. PATENT DOCUMENTS

| | | | | |
|---|---|---|---|---|
| 10,785,618 | B2 * | 9/2020 | Lee | H04W 4/40 |
| 2006/0092884 | A1 * | 5/2006 | Wild | H04B 1/7113 370/335 |
| 2019/0104525 | A1 | 4/2019 | Santhanam et al. | |
| 2020/0053528 | A1 * | 2/2020 | Wang | H04L 5/0044 |
| 2020/0260413 | A1 * | 8/2020 | Hong | H04L 5/0078 |

(Continued)

FOREIGN PATENT DOCUMENTS

| | | | |
|---|---|---|---|
| EP | 3 282 618 | A1 | 2/2018 |
| WO | 2017/133417 | A1 | 8/2017 |

(Continued)

OTHER PUBLICATIONS

Intel Corporation, "Sidelink Resource Allocation Mode-2 Design for NR V2X Communication", 3GPP TSG RAN WG1 Meeting #97, R1-1906796, May 13-17, 2019, pp. 1-19, Reno, USA.

(Continued)

*Primary Examiner* — Luat Phung
(74) *Attorney, Agent, or Firm* — Sughrue Mion, PLLC

(57) ABSTRACT

Embodiments of the present disclosure relate to method, device and computer readable medium for resource selection in V2X. The method comprises selecting, at a first terminal device, resources in at least one resource selection window for transmissions of data from the first terminal device to a second terminal device. The method also comprises determining a first number N of continuous resources in a set of the selected resources that have time-domain offsets with respect to a reference resource below a threshold offset T. The method also comprises transmitting sidelink control information to the second terminal device. The sidelink control information indicates the N continuous resources in the set of the selected resources located in the at least one resource selection window. The selected resources comprise a plurality of frequency resources in a single slot.

8 Claims, 5 Drawing Sheets

(51) Int. Cl.

*H04W 72/044* (2023.01)
*H04W 72/20* (2023.01)

(56) References Cited

U.S. PATENT DOCUMENTS

| | | | | |
|---|---|---|---|---|
| 2020/0374861 | A1* | 11/2020 | Shilov | H04W 4/46 |
| 2021/0076236 | A1* | 3/2021 | Kimura | H04W 16/18 |
| 2021/0100036 | A1* | 4/2021 | Kim | H04L 5/0055 |
| 2022/0174736 | A1* | 6/2022 | Oviedo | H04L 5/0053 |
| 2022/0263608 | A1* | 8/2022 | Wei | H04L 1/1812 |
| 2022/0361183 | A1* | 11/2022 | Behravan | H04W 72/56 |
| 2026/0143497 | A1* | 5/2026 | Lee | H04W 72/23 |

FOREIGN PATENT DOCUMENTS

| | | | |
|---|---|---|---|
| WO | 2018/201415 | A1 | 11/2018 |
| WO | 2019/059707 | A1 | 3/2019 |

OTHER PUBLICATIONS

International Search Report of PCT/CN2019/109618 dated May 27, 2020 [PCT/ISA/210].

Written Opinion of PCT/CN2019/109618 dated May 27, 2020 [PCT/ISA/237].

Intel Corporation, "UE-Autonomous Resource Allocation for NR V2X Sidelink Communication", 3GPP TSG RAN WG1 Meeting #98, R1-1908635, Aug. 26-30, 2019, Prague, Czech Republic (28 pages total).

Extended European Search Report dated Sep. 6, 2022 in European Application No. 19947672.2.

ZTE et al., "Discussion on QoS management", 3GPP TSG RAN WG1 #98, R1-1908897, Aug. 26-30, 2019, Prague, CZ, pp. 1-3 (3 pages total).

Japanese Office Action dated Dec. 12, 2023 in Japanese Application No. 2022-520124.

* cited by examiner

METHOD, DEVICE AND COMPUTER READABLE MEDIUM FOR RESOURCE SELECTION IN V2X

CROSS REFERENCE TO RELATED APPLICATIONS

This application is a National Stage of International Application No. PCT/CN2019/109618, filed Sep. 30, 2019.

TECHNICAL FIELD

Embodiments of the present disclosure generally relate to the field of communication, and in particular, to method, device and computer readable medium for resource selection in V2X.

BACKGROUND

Device to device (D2D) communications or vehicle to everything (V2X) communications are enabled in 5G New Radio (NR). A sidelink transmission via a physical sidelink control channel (PSCCH) and a physical sidelink share channel (PSSCH) have been studied to enable communication between terminal devices.

To improve transmission reliability, a blind retransmission or a feedback based retransmission may be performed. In the blind retransmission, a transmitter may perform transmission of data up to a threshold transmission number. In the feedback based retransmission, a receiver feeds back a positive acknowledgement (ACK) to the transmitter if data from the transmitter is detected correctly and a negative acknowledgement (NACK) if the data is not correctly detected. Then the transmitter may perform a retransmission if the NACK is received from the receiver. If the number of transmissions of data exceeds the threshold transmission number, the transmitter may stop the retransmission.

For the blind retransmission, in case where the threshold transmission number is configured, it needs to be discussed how to select multiple resources considering a delay budget for transmission of data, resource collision, and signaling overhead. For the feedback based retransmissions, in case where the threshold transmission number is configured, it needs to be discussed how to select multiple resources considering the delay budget, resource collision, signaling overhead, and feedbacks.

SUMMARY

In general, example embodiments of the present disclosure provide method, device and computer readable medium for resource selection in V2X.

In a first aspect, there is provided a method implemented at a first terminal device. The method comprises selecting, at a first terminal device, resources in at least one resource selection window for transmissions of data from the first terminal device to a second terminal device. The method also comprises determining a first number N of continuous resources in a set of the selected resources that have time-domain offsets with respect to a reference resource below a threshold offset T. The method also comprises transmitting sidelink control information to the second terminal device. The sidelink control information indicates the N continuous resources in the set of the selected resources located in the at least one resource selection window. The selected resources comprise a plurality of frequency resources in a single slot.

In a second aspect, there is provided a method implemented at a second terminal device. The method comprises receiving, at a second terminal device and from a first terminal device, sidelink control information indicating a first number N of continuous resources in a set of the selected resources located in at least one resource selection window. The N continuous resources have time-domain offsets with respect to a reference resource below a threshold offset T. The selected resources comprise a plurality of frequency resources in a single slot. The method also comprises receiving the data from the first terminal device based on the sidelink control information.

In a third aspect, there is provided a terminal device. The terminal device comprises a processor; and a memory coupled to the processing unit and storing instructions thereon, the instructions, when executed by the processing unit, causing the device to perform acts according to the first aspect.

In a fourth aspect, there is provided a terminal device. The terminal device comprises a processor; and a memory coupled to the processing unit and storing instructions thereon, the instructions, when executed by the processing unit, causing the device to perform acts of according to the second aspect.

In the fifth aspect, there is provided a computer readable medium having instructions stored thereon, the instructions, when executed on at least one processor, causing the at least one processor to carry out the method according to the first aspect.

In the sixth aspect, there is provided a computer readable medium having instructions stored thereon, the instructions, when executed on at least one processor, causing the at least one processor to carry out the method according to the second aspect.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a NodeB in new radio access (gNB) a Remote Radio Unit (RRU), a radio head (RH), a remote radio head (RRH), a low power node such as a femto node, a pico node, and the like. For the purpose of discussion, in the following, some embodiments will be described with reference to gNB as examples of the network device.

As used herein, the term "terminal device" refers to any device having wireless or wired communication capabilities. Examples of the terminal device include, but not limited to, user equipment (UE), vehicles, personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

Figure 1:
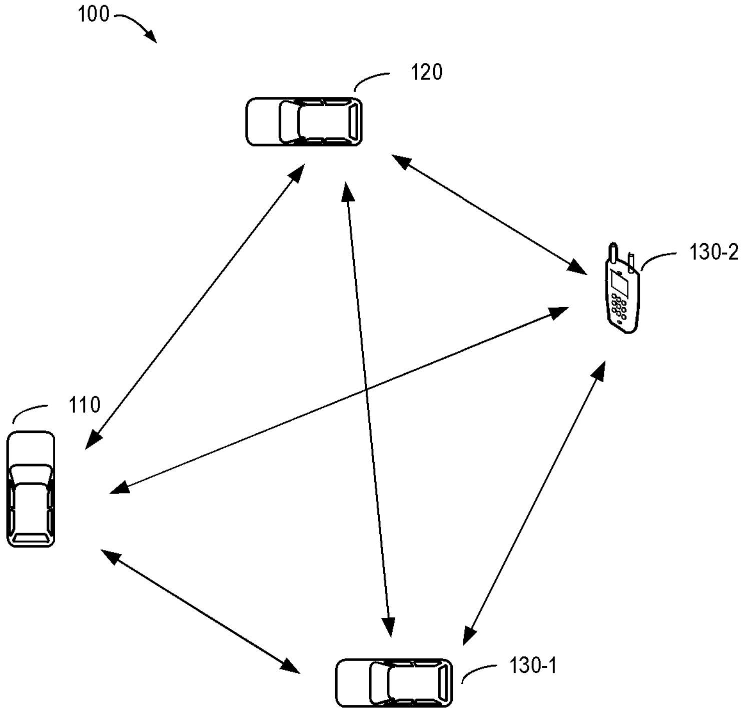
FIG. 1 is a schematic diagram of a communication environment in which some embodiments according to the present disclosure can be implemented.

FIG. 1 shows an example communication network 100 in which embodiments of the present disclosure can be implemented. The network 100 includes a first terminal device 110, a second terminal device 120, terminal devices 130-1 and 130-2 (collectively or individually referred to as a third terminal device 130) that can communicate with each other via sidelinks therebetween. In this example, the first terminal device 110, the second terminal device 120, the terminal device 130-1 are illustrated as vehicles, and the terminal device 130-1 is illustrated as a mobile device. However, in other examples, the terminal devices 110, 120, 130-1 and 130-2 may be other types of terminal devices than those shown in FIG. 1. It is to be understood that the number of terminal devices and link therebetween is only for the purpose of illustration without suggesting any limitations. The network 100 may include any suitable number of terminal devices and links adapted for implementing embodiments of the present disclosure. There may be various other terminal devices and network devices in V2X communication in many other ways.

The network 100 illustrates a scenario of V2X communication where the terminal devices 110, 120, 130-1 and 130-2 can communicate with each other. In general, V2X communication can be divided into four types, including Vehicle-to-Vehicle (V2V), Vehicle-to-Pedestrian (V2P), Vehicle-to-Infrastructure (V2I), Vehicle-to-Network (V2N). Communications between the terminal devices 110, 120, 130-1 and 130-2 (that is, V2V, V2P, V2I communications) can be performed via both Uu interface and direct links (or sidelinks). For sidelink-based V2X communication, information is transmitted from a TX terminal device to one or more RX terminal devices in a broadcast manner.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may use conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

As described above, to improve transmission reliability, a blind retransmission or a feedback based retransmission may be performed by a transmitter. For the blind retransmission, in case where the threshold transmission number is configured, it needs to be discussed how to select multiple resources considering a delay budget for transmission of data, resource collision, and signaling overhead. For the feedback based retransmissions, in case where the threshold transmission number is configured, it needs to be discusses how to select multiple resources considering the delay budget, resource collision, signaling overhead, and feedback. From resource collision point of view, to indicate as many as possible reservations in single sidelink control information (SCI) is beneficial. If this is the case, it also needs to be discussed how to indicate time and/or frequency resources of multiple reservations in SCI.

In order to at least in part solve above and other potential problems, example embodiments of the present disclosure provide a solution for resource selection. In the solution, a first terminal device selects resources in at least one resource selection window for transmissions of data from the first terminal device to a second terminal device. The first terminal device determines a first number N of continuous resources in a set of the selected resources that have time-domain offsets with respect to a reference resource below a threshold offset T. The first terminal device transmits SCI to the second terminal device. The SCI indicates the N continuous resources in the set of the selected resources located in the at least one resource selection window. This solution supports resource reservation for retransmission of data and up to 32 Hybrid Automatic Repeat Request (HARQ) retransmissions.

Principle and example embodiments will now be described in detail below with reference to the accompanying drawings. However, those skilled in the art would readily appreciate that the detailed description given herein with respect to these drawings is for explanatory purpose as the present disclosure extends beyond theses limited embodiments.

Figure 2:
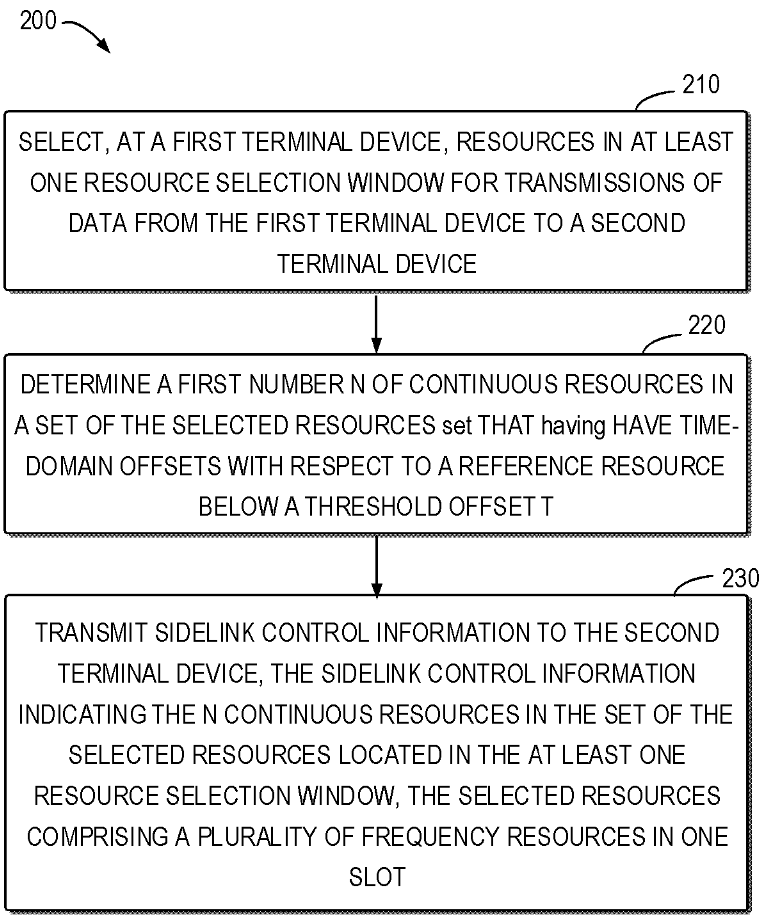
FIG. 2 illustrates a flowchart of an example method according to some embodiments of the present disclosure.

FIG. 2 illustrates a flowchart of an example method 200 in accordance with some embodiments of the present disclosure. The method 200 can be implemented at the first terminal device 110 as shown in FIG. 1. It is to be understood that the method 200 may include additional blocks not shown and/or may omit some blocks as shown, and the scope of the present disclosure is not limited in this regard. For the purpose of discussion, the method 200 will be described with reference to FIG. 1.

As shown in FIG. 2, at block 210, the first terminal device 110 selects resources in at least one resource selection window for transmissions of data from the first terminal device 110 to the second terminal device 120. The selected resources comprise a plurality of frequency resources in one slot.

At block 220, the first terminal device 110 determines a first number N of continuous resources in a set of the selected resources that have time-domain offsets with respect to a reference resource below a threshold offset T.

At block 230, the first terminal device 110 transmits SCI to the second terminal device 120. The SCI indicates the N continuous resources in the set of the selected resources located in the at least one resource selection window.

In some embodiments, a value of the first number N and a value of the threshold offset T are configured, preconfigured, or specified. In some embodiments, the threshold offset T is configured or preconfigured per resource pool, per carrier or per BandWidth Part (BWP). For example, the value of the first number N may be any of 2, 3 or 4, and the value of the threshold offset T may be 16.

In some embodiments, the at least one resource selection window comprises a single resource selection window. The first terminal device 110 selects a second number of resources in the single resource selection window with an restriction that any N continuous resources in the set of the selected resources have time-domain offsets with respect to a starting resource among the N continuous resources below the threshold offset T. The second number is not greater than a threshold transmission number M of the data to be transmitted.

In some embodiments, the threshold transmission number M is configured, preconfigured, or specified. For example, the threshold transmission number M may be configured, preconfigured, or specified as 32. Of course, the threshold transmission number M may be configured, preconfigured, or specified as any appropriate value, for example, depending on requirements on transmission reliability.

Figure 3:
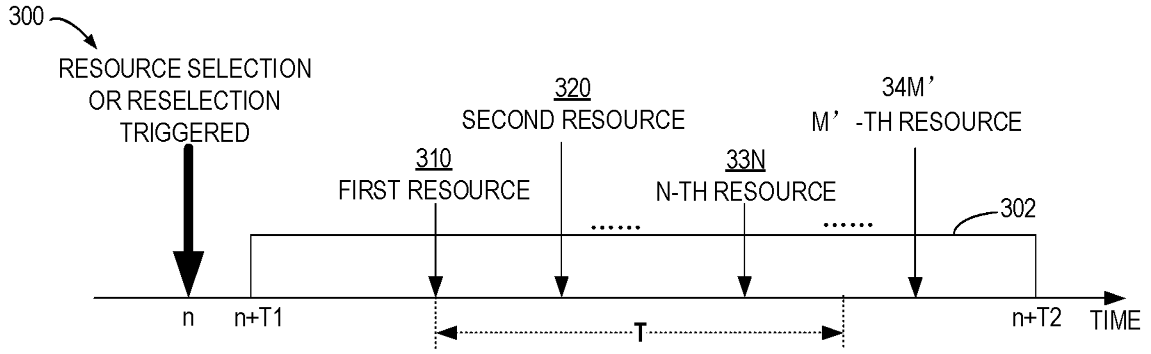
FIG. 3 illustrates a schematic diagram illustrating an example of selected resources according to some embodiments of the present disclosure.

FIG. 3 illustrates a schematic diagram 300 illustrating an example of selected resources in a single resource selection window according to some embodiments of the present disclosure. As shown, a resource selection or a resource reselection is triggered in slot n. Upon the triggering, the first terminal device 110 processes the sensed SCI received from at least one other terminal device, such as at least one of the second terminal device 120, the third terminal device 130 or 140 between slot n and slot n+T1. T1 represents time needed for processing of the sensed SCI received from the at least one other terminal device. T1 may be determined by the first terminal device 110 or specified.

Based on the processing, the first terminal device 110 selects up to M' resources, i.e. a first resource 310, a second resource 320, . . . , an N-th resource 33N, . . . , an M'-th resource 34M' in a single resource selection window 302. M' is not greater than a threshold transmission number M of the data to be transmitted. In this example, the single resource selection window 302 is defined by slot n+T1 and n+T2. T2 represents a delay budget for transmissions of data, the value of T2 is indicated by higher layer of the UE. Any N continuous resources of the up to M' resources have time-domain offsets with respect to the first resource of the N continuous resources below a threshold offset T. In other words, any N continuous resources of the up to M' resources are concentrated within T slots. In this example, the N continuous resources 310, 320, . . . , 33N have time-domain offsets with respect to resource 310 below a threshold offset T. In other words, the N continuous resources 310, 320, . . . , 33N are concentrated within T slots.

In some embodiments, the first terminal device 110 selects the resources in more than one resource selection window. In such embodiments, the at least one resource selection window comprises a first resource selection window and at least one second resource selection window subsequent to the first resource selection window. The first terminal device 110 selects a third number of resources in each of the first and second resource selection windows. The third number of resources in each of the resource selection windows have time-domain offsets with respect to a starting resource among the third number of resources below the threshold offset T. The third number is not greater than a threshold transmission number M of the data to be transmitted.

In some embodiments, the total number of the at least one resource selection window may be determined based on the following:

W is the total number of resource selection window for the transmission of the TB;

$$W=\lfloor (T2-T1+1)/w \rfloor$$

where W represents the total number of the at least one resource selection window; w represents a size of a minimum resource selection window among the at least one resource selection window, and w is specified, configured or preconfigured with a restriction that T≤w; T1 represents time needed for processing of the sensed SCI received from the at least one other terminal device; T2 represents a delay budget for transmissions of data; and the third number (represented by M2) is the smallest integer satisfying M2×W≥M.

In other embodiments, the third number is equal to the first number N, and the at least one resource selection window comprises ⌈M/N⌉ resource selection windows, where ⌈ ⌉ represents an operation of rounding up to an integer. In such embodiments, sizes of the ⌈M/N⌉ resource selection windows may be determined based on the following:

a size of each of W−1 resource selection windows is equal to ⌊(T2−T1+1)/W⌋, and a size of a starting resource selection window or an ending resource selection window is equal to ⌊(T2−T1+1)/W⌋+[(T2−T1+1) mod W], where W represents the total number of the at least one resource selection window; T1 represents time needed for processing of the sensed SCI received from the at least one other terminal device; T2 represents a delay budget for transmissions of data.

Figure 4:
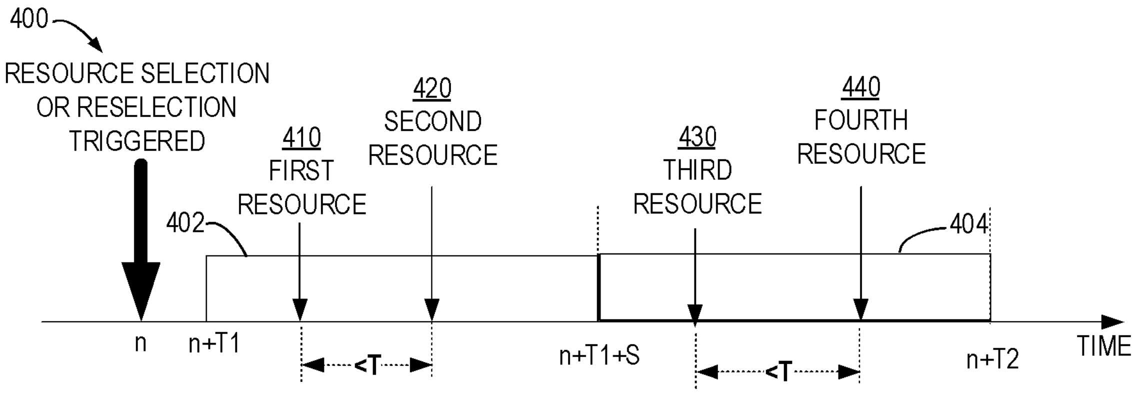
FIG. 4 illustrates a schematic diagram illustrating an example of selected resources according to some other embodiments of the present disclosure.

FIG. 4 illustrates a schematic diagram 400 illustrating an example of selected resources in two resource selection windows according to some embodiments of the present disclosure. In this example, the first number N of continuous resources is equal to 2.

As shown, a resource selection or a resource reselection is triggered in slot n. Upon the triggering, the first terminal device 110 processes the sensed SCI received from at least one other terminal device between slot n and slot n+T1. Based on the processing, the first terminal device 110 selects a first resource 410 and a second resource 420 in a first resource selection window 402. The first resource selection window 402 is defined by slot n+T1 and slot n+T1+S, where S=⌈(T2−T1+1)/2⌉−1 in this example. The two continuous resources 410 and 420 have time-domain offsets with respect to a reference resource below the threshold offset T. In other words, the two continuous resources 410 and 420 are concentrated within T slots. With respect to the first resource selection window 402, the reference resource is the first resource 410.

The first terminal device 110 also selects a third resource 430 and a fourth resource 440 in a second resource selection window 404. The second resource selection window 404 is defined by slot n+T1+S and slot n+T2. T2 represents a delay budget for transmissions of data. The two continuous resources 430 and 440 have time-domain offsets with respect to a reference resource below the threshold offset T. In other words, the two continuous resources 430 and 440 are concentrated within T slots. With respect to the second resource selection window 404, the reference resource is the third resource 430.

In some embodiments, the at least one resource selection window comprises a first resource selection window and at least one second resource selection window. The first terminal device 110 selects a fourth number of resources in the first resource selection window, selects a fifth number of resources in one of the at least one second resource selection window if no end condition being met, and repeating the selecting of the fifth number of resources until an end condition is met. The fourth number of resources in each of the resource selection windows have time-domain offsets with respect to a starting resource of the fourth number of resources below the threshold offset T. The fifth number of resources in each of the resource selection windows have time-domain offsets with respect to a starting resource of the fifth number of resources below the threshold offset T. The fourth number or the fifth number is not greater than a threshold transmission number M of the data.

For example, with reference to FIG. 4, upon selecting the first resource 410 and the second 420 in the first resource selection window 402, the first terminal device 110 may determine whether an end condition is met. In some embodiments, the end condition comprises at least one of the following: the number of the selected resources being equal to or greater than the threshold transmission number M, expiration of the delay budget T2 for the transmissions of the data, or reception of a feedback indicating an successful reception of the data.

If no end condition being met, the first terminal device 110 selects the fifth number of resources (for example, the third resource 430 and the fourth resource 440) in the second resource selection window 404. In case where there is more than one second resource selection window, the first terminal device 110 repeats the selecting of the fifth number of resources in one more second selection window subsequent to the resource selection window 404 until an end condition is met.

In some embodiments, a size of the first resource selection window and a size of each of the at least one second resource selection window are both above the threshold offset T. For example, as shown in FIG. 4, a size of the first resource selection window 402 is above the threshold offset T, and a size of the second resource selection window 404 is above the threshold offset T.

In such embodiments, if a feedback indicating an unsuccessful reception of the data is successfully decoded at a resource subsequent to an ending resource in one of the first and second resource selection windows, the first terminal device 110 selects the fifth number of resources in the subsequent at least one second resource selection window at the resource. For example, as shown in FIG. 4, if the feedback is successfully decoded in a slot subsequent to a slot n+T1+S in the first resource selection window 402, the first terminal device 110 selects the fifth number of resources in the subsequent second resource selection window 404 in the slot subsequent to the slot n+T1+S.

In some embodiments, the fifth number is equal to a difference between the first number and one, and a size of the fourth resource selection window is below the threshold offset.

In such embodiments, if a feedback indicating an unsuccessful reception of the data is successfully decoded at an ending resource in one of the first and second resource selection windows, the first terminal device 110 selects the fifth number of resources in the subsequent at least one second resource selection window at the ending resource.

In such embodiments, the at least one subsequent second resource selection window is determined based on at least one of the following: a time-domain location of the ending resource, time needed for processing of further SCI received from at least one third terminal device, the threshold offset, or a delay budget for the transmissions of data.

Figure 5:
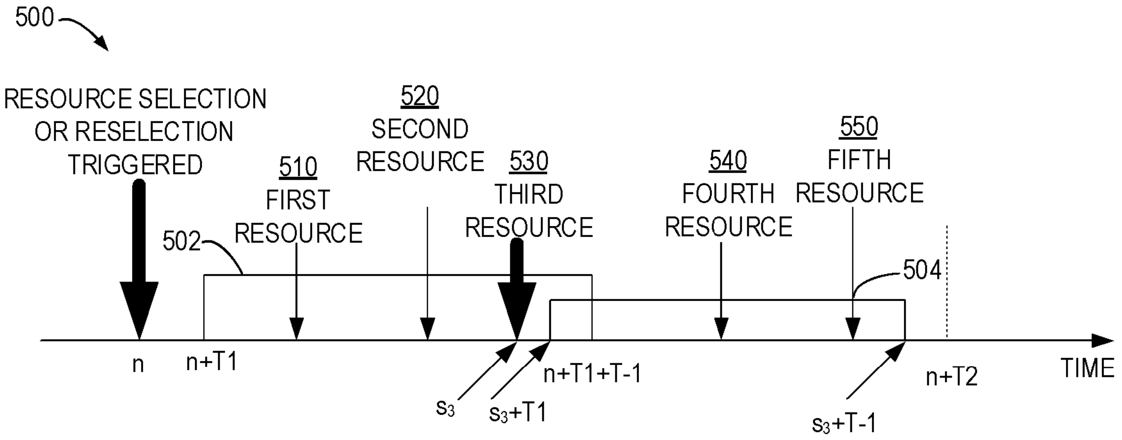
FIG. 5 illustrates a schematic diagram illustrating an example of selected resources according to still other embodiments of the present disclosure.

Consider an example as shown in FIG. 5. FIG. 5 illustrates a schematic diagram 500 illustrating an example of selected resources in two resource selection windows according to some embodiments of the present disclosure. In this example, the first number N of continuous resources is equal to 3.

As shown, a resource selection or a resource reselection is triggered in slot n. Upon the triggering, the first terminal device 110 processes the sensed SCI received from at least one other terminal device between slot n and slot n+T1. Based on the processing, the first terminal device 110 selects a first resource 510, a second resource 520 and a third resource 530 in a first resource selection window 502. The first resource selection window 502 is defined by slot n+T1 and slot n+T1+T−1. The three continuous resources 510, 520 and 530 have time-domain offsets with respect to a reference resource below the threshold offset T. In other words, the three continuous resources 510, 520 and 530 are concentrated within T slots. With respect to the first resource selection window 502, the reference resource is the first resource 510.

The first terminal device 110 also selects a fourth resource 540 and a fifth resource 550 in a second resource selection window 504. The second resource selection window 504 is defined by slot n+T1+T−1 and slot $S_3$+T−1. $S_3$ represents a slot where the third resource 530 is located. The three continuous resources 530, 540 and 550 have time-domain offsets with respect to a reference resource below the threshold offset T. In other words, the three continuous resources 530, 540 and 550 are concentrated within T slots. With respect to the second resource selection window 504, the reference resource is the third resource 530.

In the example as shown in FIG. 5, if a feedback indicating an unsuccessful reception of the data is successfully decoded at an ending resource (i.e., the third resource 530) in the first resource selection window 502, the first terminal device 110 selects the fifth number of resources in the subsequent second resource selection window 504 at the third resource 530. In addition, the first terminal device 110 may transmit at the third resource 530 SCI indicating the three continuous resources 530, 540 and 550.

In general, in the example as shown in FIG. 5, each of the at least one second resource selection window may be defined by $s_N$+T1 and min($s_N$+T−1, n+T2), where $s_N$ represents a slot where the $N^{th}$ selected resource is located.

In some embodiments, the fifth number is equal to one, and a size of each of the at least one second resource selection window is below the threshold offset.

In such embodiments, if a feedback indicating an unsuccessful reception of the data is successfully decoded at a resource subsequent to a starting resource in one of the at least one second resource selection window, the first terminal device 110 selects the fifth number of resources at the resource, updating the starting resource with the resource.

In such embodiments, each of the at least one second resource selection window is determined based on at least one of the following: a time-domain location of the last selected resource, a time-domain location of the resource subsequent to the starting resource, time needed for processing of further SCI received from at least one third terminal device, the threshold offset, or a delay budget for the transmissions of data.

Figure 6:
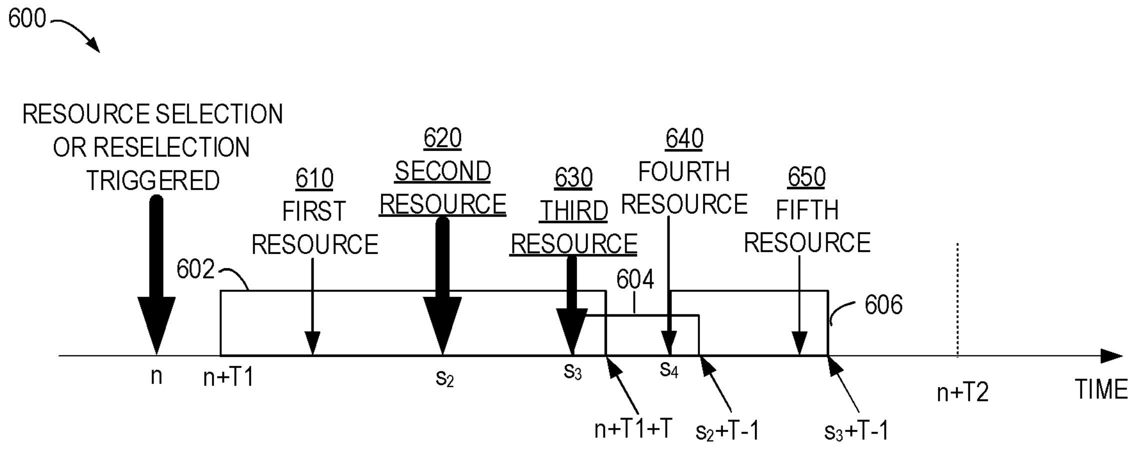
FIG. 6 illustrates a schematic diagram illustrating an example of selected resources according to still other embodiments of the present disclosure.

Consider an example as shown in FIG. 6. FIG. 6 illustrates a schematic diagram 600 illustrating an example of selected resources in three resource selection windows according to some embodiments of the present disclosure. In this example, the first number N of continuous resources is equal to 3.

As shown, a resource selection or a resource reselection is triggered in slot n. Upon the triggering, the first terminal device 110 processes the sensed SCI received from at least one other terminal device between slot n and slot n+T1. Based on the processing, the first terminal device 110 selects a first resource 610, a second resource 620 and a third resource 630 in a first resource selection window 602. The first resource selection window 602 is defined by slot n+T1 and slot n+T1+T. The three continuous resources 610, 620 and 630 have time-domain offsets with respect to a reference resource below the threshold offset T. In other words, the three continuous resources 610, 620 and 630 are concentrated within T slots. With respect to the first resource selection window 602, the reference resource is the first resource 610.

The first terminal device 110 also selects a fourth resource 640 in a second resource selection window 604. The second resource selection window 604 is defined by slot $S_3$ and slot $S_2$+T−1. $S_2$ represents a slot where the second resource 620 is located. $S_3$ represents a slot where the third resource 630 is located. The three continuous resources 620, 630 and 640 have time-domain offsets with respect to a reference resource below the threshold offset T. In other words, the three continuous resources 620, 630 and 640 are concentrated within T slots. With respect to the second resource selection window 604, the reference resource is the second resource 620.

In the example as shown in FIG. 6, if a feedback indicating an unsuccessful reception of the data is successfully decoded at a resource (for example, the second resource 620) subsequent to a starting resource (for example, the first resource 610) in the first resource selection window 602, the first terminal device 110 selects the fourth resource 640 in the subsequent second resource selection window 604 at the second resource 620. In addition, the first terminal device 110 may transmit at the second resource 620 SCI indicating the three continuous resources 620, 630 and 640.

Upon selection, the first terminal device 110 updates the starting resource with the resource subsequent to starting resource. For example, upon selection of the fourth resource 640, the first terminal device 110 updates the starting resource as the second resource 620.

Similarly, if the feedback indicating the unsuccessful reception of the data is successfully decoded at the third resource 630 subsequent to the second resource 620 in the second resource selection window 604, the first terminal device 110 selects a fifth resource 650 in the subsequent second resource selection window 606 at the third resource 630. Upon selection of the fifth resource 650, the first terminal device 110 updates the starting resource as the third resource 630. In this example, the subsequent second resource selection window 606 is defined by slot $S_4$ and slot $S_3$+T−1. $S_4$ represents a slot where the fourth resource 640 is located.

In general, in the example as shown in FIG. 6, each of the at least one second resource selection window may be defined by $S_{end}$ and min($s_i$+T−1, n+T2), where $S_{end}$ represents a slot where the last selected resource is located, $s_i$ represents a slot where $i^{th}$ selected resource is located, and 2≤i.

In some embodiments, a starting point of the at least one second resource selection window may be moved to a resource prior to the last selected resource $s_{end}$. Thus, more available resources may be selected.

Figure 7:
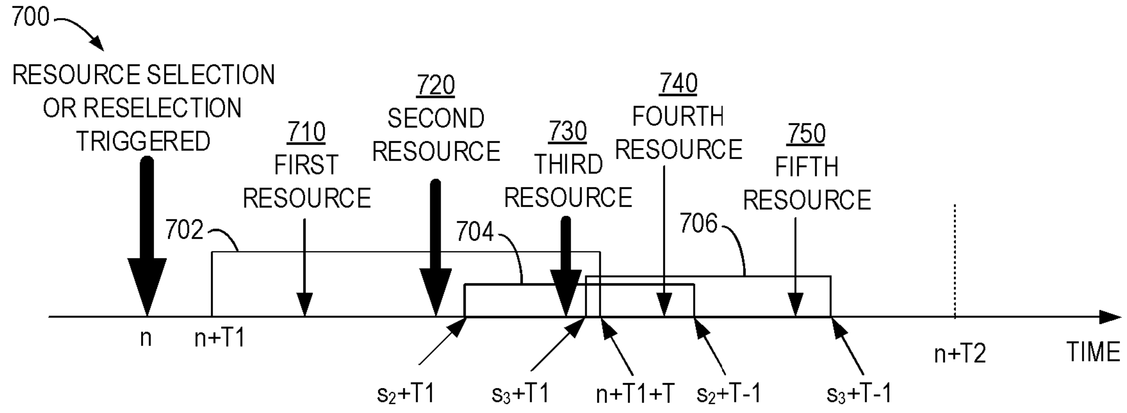
FIG. 7 illustrates a schematic diagram illustrating an example of selected resources according to yet other embodiments of the present disclosure.

Consider an example as shown in FIG. 7. FIG. 7 illustrates a schematic diagram 700 illustrating an example of selected resources in three resource selection windows according to some embodiments of the present disclosure. In this example, the first number N of continuous resources is equal to 3.

As shown, a resource selection or a resource reselection is triggered in slot n. Upon the triggering, the first terminal device 110 processes the sensed SCI received from at least one other terminal device between slot n and slot n+T1. Based on the processing, the first terminal device 110 selects a first resource 710, a second resource 720 and a third resource 730 in a first resource selection window 702. The first resource selection window 702 is defined by slot n+T1 and slot n+T1+T. The three continuous resources 710, 720 and 730 have time-domain offsets with respect to a reference resource below the threshold offset T. In other words, the three continuous resources 710, 720 and 730 are concentrated within T slots. With respect to the first resource selection window 702, the reference resource is the first resource 710.

The first terminal device 110 also selects a fourth resource 740 in a second resource selection window 704. The second resource selection window 704 is defined by slot $S_2$+T1 and slot $S_2$+T−1. $S_2$ represents a slot where the second resource 720 is located. The three continuous resources 720, 730 and 740 have time-domain offsets with respect to a reference resource below the threshold offset T. In other words, the three continuous resources 720, 730 and 740 are concentrated within T slots. With respect to the second resource selection window 704, the reference resource is the second resource 720.

In the example as shown in FIG. 7, if a feedback indicating an unsuccessful reception of the data is successfully decoded at a resource (for example, the second resource 720) subsequent to a starting resource (for example, the first resource 710) in the first resource selection window 702, the first terminal device 110 selects the fourth resource 740 in the subsequent second resource selection window 704 at the second resource 720. In addition, the first terminal device 110 may transmit at the second resource 720 SCI indicating the three continuous resources 720, 730 and 740.

Upon selection, the first terminal device 110 updates the starting resource with the resource subsequent to starting resource. For example, upon selection of the fourth resource 740, the first terminal device 110 updates the starting resource as the second resource 720.

Similarly, if the feedback indicating the unsuccessful reception of the data is successfully decoded at the third resource 730 subsequent to the second resource 720 in the second resource selection window 704, the first terminal device 110 selects a fifth resource 750 in the subsequent second resource selection window 706 at the third resource 730. Upon selection of the fifth resource 750, the first terminal device 110 updates the starting resource as the third resource 730. In this example, the subsequent second resource selection window 706 is defined by slot $S_3$+T1 and slot $S_3$+T−1. $S_3$ represents a slot where the third resource 730 is located.

In general, in the example as shown in FIG. 7, each of the at least one second resource selection window may be defined by $s_i$+T1 and min($s_i$+T−1, n+T2), where $s_i$ represents a slot where the $i^{th}$ selected resource is located, and 2≤i.

In some embodiments, the N continuous resources comprise a first resource and a plurality of second resources subsequent to the first resource. In such embodiments, the first terminal device 110 transmits the SCI at the first resource. In other words, SCI transmitted in the $i^{th}$ selected resource indicates reservation of resources i+1, i+2, . . . , i+N−1.

In such embodiments, an index indicating time-domain offsets of the second resources with respect to the first resource is determined based on at least one of the following: the threshold offset T, the first number N of the continuous resources, or the time-domain offsets of the second resources; and the SCI comprises the index.

In such embodiments, the index may be determined based on the following:

$$r_i = \sum_{l=0}^{N-2} \left\langle \begin{matrix} T-1-\Delta_{i+1+l} \\ N-1-l \end{matrix} \right\rangle,$$

where $r_i$ represents the index, T represents the threshold offset, N represents the first number of the continuous resources, $1 \le \Delta_{i+1+l} \le T-1$, $\Delta_{i+1+l} < \Delta_{i+1+l+1}$, $\Delta_{i+1+l}$ represents a time-domain offset of one of the second resources with respect to the first resource, $$\left\langle \begin{matrix} T-1-\Delta_{i+1+l} \\ N-1-l \end{matrix} \right\rangle = \begin{cases} \begin{pmatrix} T-1-\Delta_{i+1+l} \\ N-1-l \end{pmatrix}, & \text{if } N-1-l \le T-1-\Delta_{i+1+l} \\ 0, & \end{cases}$$

represents an extended binomial coefficient, $$r_i \in \left\{0, \ldots \begin{pmatrix} T-1 \\ N-1 \end{pmatrix} - 1\right\}.$$

In such embodiments, the first terminal device 110 determines whether a retransmission at least one of the second resources is disabled. If the retransmission is disabled, the first terminal device 110 sets a starting location of a frequency resource associated with the at least one of the second resources to be a predefined value, and includes the predefined value in the SCI. For example, the predefined value may be −1.

In embodiments where the at least one resource selection window comprises a first resource selection window and at least one second resource selection window, the first terminal device 110 may select different sizes of frequency-domain resources in different resource selection windows so as to improve flexibility. For example, the plurality of frequency resources in the selected resources may comprise: a first set of frequency-domain resources associated with the selected resources in the first resource selection window, and a second set of frequency-domain resources associated with the selected resources in one of the at least one second resource selection window. A size of the first set is different from a size of the second set.

Figure 8:
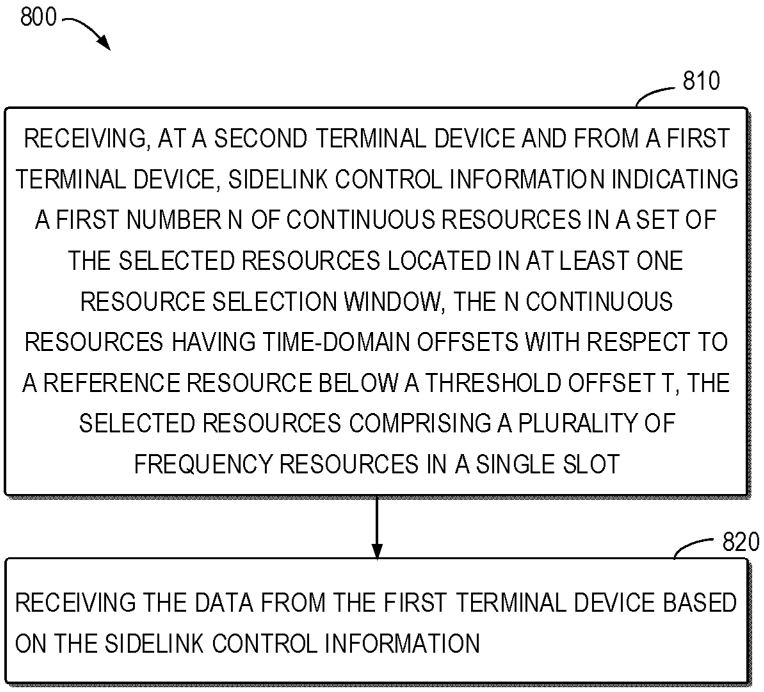
FIG. 8 illustrates a flowchart of an example method in accordance with still other embodiments of the present disclosure.

FIG. 8 illustrates a flowchart of an example method 800 in accordance with some embodiments of the present disclosure. The method 800 can be implemented at the second terminal device 120 as shown in FIG. 1. It is to be understood that the method 800 may include additional blocks not shown and/or may omit some blocks as shown, and the scope of the present disclosure is not limited in this regard. For the purpose of discussion, the method 800 will be described with reference to FIG. 1.

As shown in FIG. 8, at block 810, the second terminal device 120 receives, from the first terminal device 110, SCI indicating a first number N of continuous resources in a set of the selected resources located in at least one resource selection window. The N continuous resources have time-domain offsets with respect to a reference resource below a threshold offset T. The selected resources comprise a plurality of frequency resources in a single slot. The method also comprises receiving the data from the first terminal device based on the SCI.

At block 820, the second terminal device 120 receives the data from the first terminal device 110 based on the SCI.

In some embodiments, a value of the first number N and a value of the threshold offset T are configured, preconfigured, or specified.

In some embodiments, the N continuous resources comprise a first resource and a plurality of second resources subsequent to the first resource; and receiving the SCI comprises receiving the SCI at the first resource.

In some embodiments, an index indicating time-domain offsets of the second resources with respect to the first resource is determined based on at least one of the following: the threshold offset, the first number of the continuous resources, or the time-domain offsets of the second resources; and the SCI comprises the index.

In some embodiments, the index exclusively corresponds to one combination within T−1 slots. In such embodiments, the index is determined based on the following:

$$r_i = \sum_{l=0}^{N-2} \left\langle \begin{matrix} T-1-\Delta_{i+1+l} \\ N-1-l \end{matrix} \right\rangle$$

where $r_i$ represents the index, T represents the threshold offset, N represents the first number of the continuous resources, $1 \le \Delta_{i+1+l} \le T-1$, $\Delta_{i+1+l} < \Delta_{i+1+l+1}$, $\Delta_{i+1+l}$ represents a time-domain offset of one of the second resources with respect to the first resource, $$\left\langle \begin{matrix} T-1-\Delta_{i+1+l} \\ N-1-l \end{matrix} \right\rangle = \begin{cases} \binom{T-1-\Delta_{i+1+l}}{N-1-l}, & \text{if } N-1-l \le T-1-\Delta_{i+1+l} \\ 0, & \end{cases}$$

represents an extended binomial coefficient, resulting in a unique $$r_i \in \left\{0, \ldots \binom{T-1}{N-1} - 1\right\}.$$

It shall be appreciated that descriptions of features with reference to FIGS. 1 to 7 also apply to the method 800, and have the same effects. Thus, the details of the features are omitted.

Figure 9:
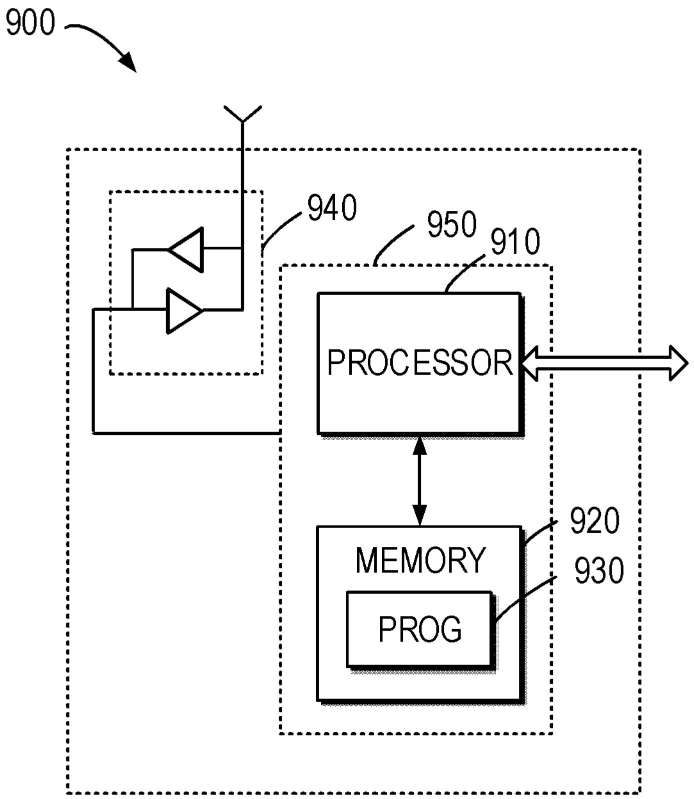
FIG. 9 is a simplified block diagram of a device that is suitable for implementing embodiments of the present disclosure.

FIG. 9 is a simplified block diagram of a device 900 that is suitable for implementing embodiments of the present disclosure. The device 900 can be considered as a further example implementation of the terminal device 110 as shown in FIG. 1. Accordingly, the device 900 can be implemented at or as at least a part of the terminal device 110 or the terminal device 120.

As shown, the device 900 includes a processor 910, a memory 920 coupled to the processor 910, a suitable transmitter (TX) and receiver (RX) 940 coupled to the processor 910, and a communication interface coupled to the TX/RX 940. The memory 910 stores at least a part of a program 930. The TX/RX 940 is for bidirectional communications. The TX/RX 940 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 930 is assumed to include program instructions that, when executed by the associated processor 910, enable the device 900 to operate in accordance with the embodiments of the present disclosure, as discussed herein with reference to FIGS. 2-8. The embodiments herein may be implemented by computer software executable by the processor 910 of the device 900, or by hardware, or by a combination of software and hardware. The processor 910 may be configured to implement various embodiments of the present disclosure. Furthermore, a combination of the processor 910 and memory 910 may form processing means 950 adapted to implement various embodiments of the present disclosure.

The memory 910 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 910 is shown in the device 900, there may be several physically distinct memory modules in the device 900. The processor 910 may be of any type suitable to the local technical network, and may include one or more of general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 2. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first terminal device comprising:

at least one processor configured to cause the first terminal device to:

determine N resources with N smallest slot indices from a set of selected resources for transmission from the first terminal device to a second terminal, wherein a slot offset of each resource in the N resources with respect to the first resource in the N resources is below a threshold; and transmit, to the second terminal, sidelink control information (SCI) indicating the N resources.

2. The first terminal device of claim 1, wherein the first terminal device is caused to transmit the SCI by transmitting the SCI at the first resource in the N resources.

3. The first terminal device of claim 1, wherein a selected resource in the set of the selected resources comprises a plurality of frequency resources in a slot.

4. The first terminal device of claim 1, wherein the first terminal device is further caused to determine first N resources from the set of the selected resources as the N resources.

5. A method performed by a first terminal device, the method comprising:

determining N resources with N smallest slot indices from a set of selected resources for transmission from the first terminal device to a second terminal, wherein a slot offset of each resource in the N resources with respect to the first resource in the N resources is below a threshold; and transmitting, to the second terminal, sidelink control information (SCI) indicating the N resources.

6. The method of claim 5, wherein the transmitting the SCI comprises transmitting the SCI at the first resource in the N resources.

7. The method of claim 5, wherein a selected resource in the set of the selected resources comprises a plurality of frequency resources in a slot.

8. The method of claim 5, further comprising determining first N resources from the set of the selected resources as the N resources.

* * * * *